(12) United States Patent
Varpula et al.

(10) Patent No.: US 7,714,593 B2
(45) Date of Patent: May 11, 2010

(54) RADIOFREQUENCY BASED SENSOR ARRANGEMENT AND A METHOD

(75) Inventors: Timo Varpula, Vantaa (FI); Heikki Seppä, Helsinki (FI); Juha-Matti Saari, Espoo (FI)

(73) Assignee: UPM-Kymmene Corporation, Helsinki (FI)

( * ) Notice: Subject to any disclaimer, the term of this patent is extended or adjusted under 35 U.S.C. 154(b) by 0 days.

(21) Appl. No.: 10/583,381

(22) PCT Filed: Dec. 16, 2004

(86) PCT No.: PCT/FI2004/050188

§ 371 (c)(1),
(2), (4) Date: Jun. 18, 2007

(87) PCT Pub. No.: WO2005/059859

PCT Pub. Date: Jun. 30, 2005

(65) Prior Publication Data

US 2007/0241762 A1    Oct. 18, 2007

(30) Foreign Application Priority Data

Dec. 18, 2003   (FI) ................................. 20031861

(51) Int. Cl.
*G01R 27/28* (2006.01)
(52) U.S. Cl. .................. 324/654; 340/539.26; 436/121; 426/231
(58) Field of Classification Search .................. 324/654; 436/121
See application file for complete search history.

(56) References Cited

U.S. PATENT DOCUMENTS

| | | | |
|---|---|---|---|
| 5,443,987 A | 8/1995 | DeCicco et al. | |
| 5,663,072 A | 9/1997 | Honeybourne | |
| 6,025,725 A * | 2/2000 | Gershenfeld et al. | 324/652 |
| 6,204,764 B1 * | 3/2001 | Maloney | 340/568.1 |
| 2003/0161511 A1 | 8/2003 | Vermesan et al. | |
| 2003/0200814 A1 | 10/2003 | Oh et al. | |
| 2007/0176773 A1 * | 8/2007 | Smolander et al. | 340/539.26 |

FOREIGN PATENT DOCUMENTS

DE   10128010 A1   2/2003

(Continued)

OTHER PUBLICATIONS

K.G. Ong et al.; Monitoring of bacteria growth using a wireless, remote query resonant-circuit sensor: application to environmental sensing; Biosensors Bioelectronics 16 (2001) pp. 305-312.

(Continued)

*Primary Examiner*—Timothy J Dole
*Assistant Examiner*—Benjamin M Baldridge
(74) *Attorney, Agent, or Firm*—Venable LLP; Eric J. Franklin

(57) ABSTRACT

A sensor arrangement for a sensor arrangement remotely readable by radio frequencies. The sensor arrangement includes an LC resonator that includes a capacitor and a coil, and a sensor element coupled to the LC resonator whose properties change as a function of a measurable quantity. A sensor element according to the invention does not form a direct galvanic contact with the LC resonator, rather the coupling is implemented capacitively or inductively.

19 Claims, 4 Drawing Sheets

FOREIGN PATENT DOCUMENTS

| WO | WO-93/03920 A1 | 3/1993 |
| WO | WO-95/33991 A1 | 12/1995 |
| WO | WO-98/21120 A1 | 5/1998 |
| WO | WO-99/04256 A1 | 1/1999 |
| WO | WO-03/044521 A1 | 5/2003 |

OTHER PUBLICATIONS

K.G. Ong et al.; Design and application of a wireless, passive, resonant-circuit environmental monitoring sensor; Sensors and Actuators A 93 (2001); pp. 33-43.

J. Wagner et al.; Inductively coupled, polymer coated surface acoustic wave sensor for organic vapors; Sensors and Actuators B: Chemical, vol. 76, Issues 1-3, Jun. 2001, pp. 58-63.

Klaus Beck et al; Inductively Coupled Surface Acoustic Wave Device for Sensor Application; IEEE Transactions on Ultrasonics, Ferroelectrics and Frequency Control; vol. 45, No. 5, Sep. 1998, pp. 1140-1144.

John C. Butler et al.; Wireless, passive, resonant-circuit, inductively coupled, inductive strain sensor; Sensors and Actuators A, 102 (2002); pp. 61-66.

\* cited by examiner

RADIOFREQUENCY BASED SENSOR ARRANGEMENT AND A METHOD

CROSS-REFERENCE TO RELATED APPLICATIONS

This application claims priority to Finnish patent application 20031861 filed 18 Dec. 2003 and is the national phase under 35 U.S.C. §371 of PCT/FI2004/050188 filed 16 Dec. 2004.

FIELD OF THE INVENTION

The invention relates to a sensor arrangement.

BACKGROUND OF THE INVENTION

The leakproofness, low oxygen content and adequately low storage temperature of a package are the most important requirements for many packaged foodstuffs. When a protective gas package leaks, the protective gas travels out of the package, oxygen, damaging to the preservation of the quality of many products, gets into the package and the additional preservation provided by the original gas mixture of the package is lost. The passage of oxygen into the package is damaging also in the case of vacuum packages. In addition to the wholeness and storage temperature of a package the high quality of a raw material used is an essential factor for maintaining organoleptic and microbiological quality particularly with uncooked products. As a result of the microbe activity occurring during the deterioration of a product, numerous amounts of evaporative compounds and compounds remaining in the product are generated whose quality and amounts are greatly affected by the nature and chemical composition of the foodstuff as well as by the microbe causing deterioration. These generated compounds affect on one hand the organoleptic quality of the foodstuff and on the other hand they function as indicators of microbiological quality of the foodstuff. The composition of the compounds generated by deterioration depends on the foodstuff, and for example in case of the deterioration of poultry the generation of different types of sulphur compounds (for example hydrogen sulphide, dimethyl sulphide, dimethyl disulphide) is typical.

Known applications associated with RF-reading techniques are for instance burglar alarms and remote sensors (RFID).

The burglar alarms used in these applications are either destroyed or deactivated in a controlled manner. Remote sensors for their part are suitable only for recognition of a product or for saving a piece of information into the memory of a remote sensor. Burglar alarms and remote sensors do not have the ability to indicate cumulative events such as deterioration inside a foodstuff package.

The color change of previously described indicators reacting to compounds generated in deterioration or to oxygen content of the package is visible. The primary function of visible indicators is to help the consumer evaluate the quality of the product at the time of purchase or at home. On the other hand on the part of wholesale and retail sales it would be efficient to verify the wholeness of the package and the quality of the product already before a consumer purchases it.

From WO 95/33991 is known a solution in which an indicator contains electronics and typically a screen that is integrated into the indicator. Alternatively, the indicator may have an output for sending a signal galvanically to the exterior measuring device. Such an indicator provided with its own screen is inevitably an expensive solution. Reading by an exterior device implemented by a galvanic connection is on the other hand quite an awkward way to obtain information from individual foodstuff packages.

From e.g. U.S. Pat. No. 5,443,987, WO 9821120, EP patent 0666799 and WO 9904256 are known indicators in which a change in color or outward appearance occurs when the product deteriorates.

From U.S. Pat. No. 5,663,072 is known a solution in which by adding suitable chemicals the condition of a meat package can be evaluated by the changes of the absorption or reflective properties of the package itself upon exposure to electromagnetic radiation. The suitability of chemicals for use in foodstuffs may create problems and additionally the manner of measurement is quite inexact.

None of the hydrogen sulphide sensors described above is readable by RF-techniques nor are they suitable for placement in a foodstuff package and being read without breaking or touching the package. On the other hand the publications mentioned above also do not present application of RF-reading technology for measuring the quality of the packaged foodstuff.

From application No. PCT/FI02/00911 is known a solution in which an indicator is placed inside a package, wherein the indicator is an LC (inductor-capacitor) circuit to which a sensor element is connected. The electrical properties of the sensor element change cumulatively as a result of deterioration of the product. The sensor reacts either directly to deterioration of the product or to evaporative compound resulting from deterioration or to oxygen gas that has leaked into the package. In this solution the sensor element is coupled by bonding or electricity-conducting glue to the LC resonator such that electrical current induced to the circuit flows through the sensor element. Deterioration, an evaporative compound resulting from it or oxygen will cause corrosion in the sensor element, which is why the sheet resistance of the sensor increases. The change in the properties of the element affects either the loss resistance of the LC resonator or through it the quality factor of the circuit, the so-called Q-factor, or the sensor element changes the capacitance or the inductance of the circuit. What is essential in this solution is that the entire indicator formed by the LC circuit and the sensor element is placed inside the package and the sensor element is coupled to the resonance circuit essentially galvanically, i.e. by bonding or gluing. The indicator is read from outside the package by a reading device. It generates an alternate magnetic field whose frequency is typically wiped through the resonance frequency of the LC resonator. In this way the reading device measures the resonance frequency and the Q-factor of the LC resonator. The measurement result is proportional to the deterioration of the product or to the amount of oxygen in the package.

In this method the disadvantage is that the manufacture of the indicator formed from an LC resonator is relatively expensive. In particular, the attachment of the sensor element by either bonding or gluing with electricity-conducting glue is not inexpensive. Bonding is an expensive technique. It is not an adequately cost-effective means to be used in cheap mass production. Attachment by electricity-conducting glue for its part would cause a too high contact resistance. It has become apparent that the contact impedance of the sensor element and the LC resonator should be in the range of 0.2 Ohms. In practice, achieving such low total impedance is technically difficult and expensive.

In the publications "Design and application of a wireless, passive, resonant-circuit environmental monitoring sensor", *Sensors and Actuators* A 93, 2001, 33-43 and "Monitoring of bacteria growth using a wireless, remote query resonant-circuit sensor: application to environmental sensing", *Biosensors&Bioelectronics* 16, 2001, 305-312 an indicator based on an LC resonator is also described. In these publications the method is applied to monitoring an environment and indicating bacteria growth.

SUMMARY OF THE INVENTION

The object of this invention is thus to eliminate the drawbacks associated with known art and to provide a completely new type of sensor arrangement and a method. According to one preferred embodiment of the invention this invention is well suited for indicating the condition of perishable products such as foodstuffs or medicinal substances.

The basis of the invention is that the sensor element is coupled either through an alternating magnetic field (inductively) or through an alternate electric field (capacitively) to the reading device or the LC resonator.

By using the invention, significant advantages are achieved.

By using the solution according to the invention, the sensor elements can be manufactured at considerable less expense than using known art. Non-galvanic connection between the measuring circuit and the sensor enables a variety of technical implementations at reasonable expense, however, without compromising on the performance of the measurement. In solutions according to known art the forming of a galvanic contact to a very thin sensor film has been very difficult and sometimes nearly impossible and this problem the invention completely eliminates. When the sensor element is in practice a planar area, it is technically simple to manufacture.

The invention enables the manufacture of a single-use type of sensor very cost-effectively.

In addition, the sensor is suitable for many different purposes of use.

BRIEF DESCRIPTION OF THE DRAWINGS

In the following the invention is described with the aid of embodiments according to the accompanying drawings.

DETAILED DESCRIPTION OF THE INVENTION

1. Inductive Coupling

The Sensor Element and Metal Ring Inside the Package

In this embodiment of the invention, the element, being susceptible to measurable quantity, is disposed inside the package (not shown). The electrical conductivity or magnetic permeability of the element varies accumulatively in accordance to a measurable phenomenon. The electrical or magnetic properties of the element are measured outside the package inductively, wherein a deterioration event can be indicated reliably.

Figure 2:
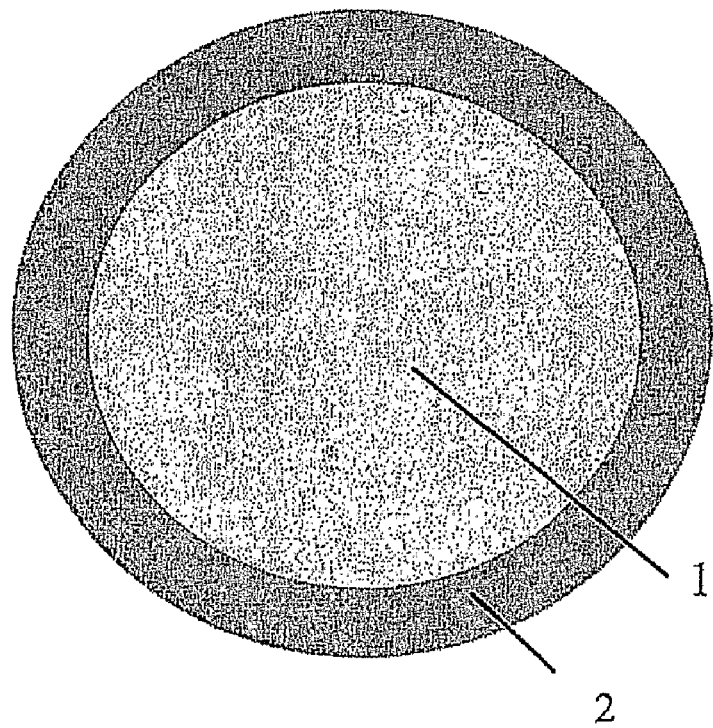
FIG. 2 shows the sensor element from the solution of FIG. 1.

The sensor element shown in FIG. 2 can be manufactured for example of silver or copper. The thickness of the planar metal layer is typically 30 nm, wherein for example already a small concentration of hydrogen sulphide (less than 1 microgram/liter) inside the package will cause within a few hours a relatively significant reduction in the average thickness of the element.

Figure 1:
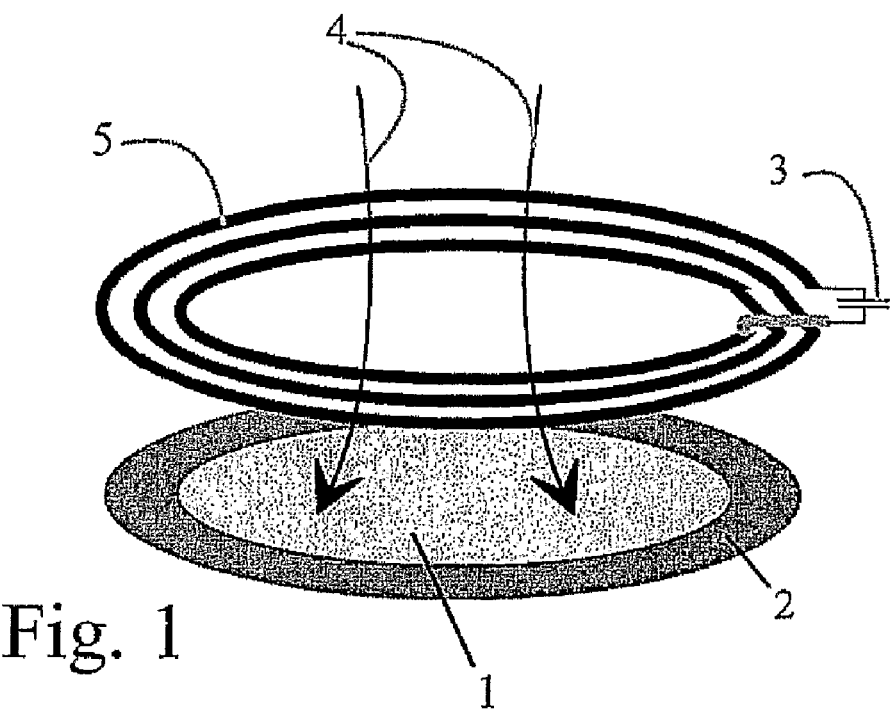
FIG. 1 shows a perspective diagram of one inductively activated sensor arrangement according to the invention.

According to FIGS. 1 and 2, surrounding the sensor element 1 is a ring 2 made of metal. The metal of the ring, for example aluminium, is not susceptible to measurable gas or oxygen generated by deterioration. Essential in this embodiment of the invention is that the thickness of the metal ring 2 is significantly greater than the penetration depth into metal of the alternating magnetic field. For example, at a frequency of 8.2 MHz the penetration depth into aluminium is about 30 micrometers. The ring 2 must be significantly thicker than this, for example 100 micrometers. This means that the ring does not essentially reduce the Q-factor of the LC resonator. The size of the sensor element and the ring depends on from how great a distance it is desired for the reading device to be able to sense changes in the sensor element. For example, a reading distance of 2 cm requires that the outer diameter of the ring 2 is about 6 cm and the inner diameter about 5 cm, which is also the outer diameter of the disc-shaped sensor element. The ring 2 and sensor element 1 may also be round, oval, square or polygonal.

Inductive measurement is carried out such that a measuring coil 5 is placed outside the package such that it generates the alternating magnetic field 4 on the location of the element inside the package. The measuring coil 5 is tuned to resonance by coupling parallel to it a capacitance 3. The alternating magnetic field of the measuring coil 5 induces in the sensor element 1 and the metal ring 2 surrounding it an eddy current which for its part produces a magnetic field and induces a voltage in the measuring coil 5. The eddy currents induced in the sensor element 1 and the ring 2 are dependent upon their electrical conductivity, magnetic permeability and the thickness of their metal layers as well as the distance from the measuring coil to them. These eddy currents for their part induce in the measuring coil 5 a voltage which is then dependent upon all the aforementioned parameters. The frequency of the alternating current fed into the measuring coil 5 is changed such that the measurement occurs at or near resonance frequency. Resonance frequency can be, for example, in the range of 7.4-8.8 MHz, which is a license-free frequency area for inductive applications. From this measurement can be determined the resonance frequency of the measuring coil 5 and the quality factor of the resonance, the so-called Q-factor. The conductivity and thickness of the metal of the sensor element 1 is chosen such that due to the inductive coupling described above the sensor element 1 affects only the Q-factor of the measuring coil. The Q-factor of the measuring coil is also dependent upon the distance between the sensor element and the coil. The ring around the sensor element is so thick that it affects the Q-factor only very slightly or essentially not at all. By contrast, due to inductive coupling, the closer it is, the more it decreases the effective inductance (L) of the measuring coil 5. The resonance frequency of the measuring coil can be calculated from the formula $f=1/(2\pi\sqrt{LC})$. Thus, the distance between the measuring coil 5 and the sensor element 1 can be determined from the measured changes in resonance frequency. When it is known, the Q-factor can be used to compensate for dependency on distance, after which the Q-factor indicates deterioration or the amount of oxygen in the package.

Figures 3, 4:
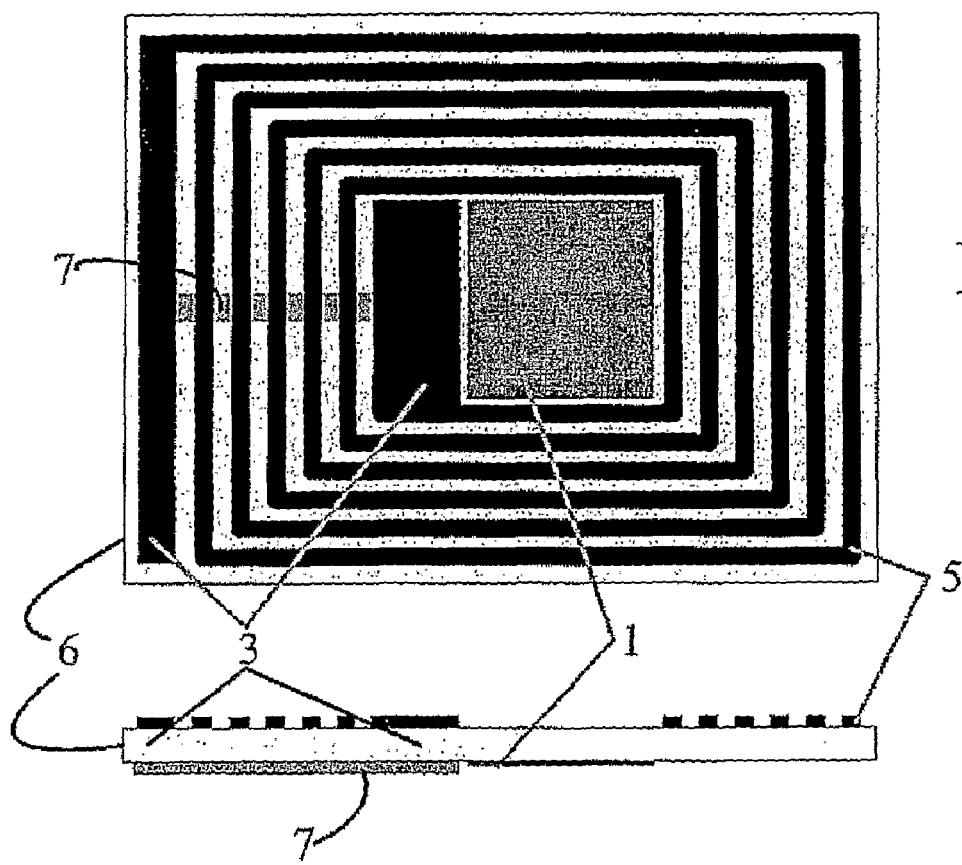
FIG. 3 shows a top view of another sensor structure according to the invention.
FIG. 4 shows a cross-sectional elevation view of the sensor structure as in FIG. 3.

In a second embodiment of the invention, the sensor element is a part of the LC resonator such that it couples inductively (by an alternating magnetic field) to the LC resonator. This alternative is shown in FIGS. 3 and 4. The sensor element 1 and the LC resonator 3, 5 form a transponder, which is disposed inside the package. This complex is formed on the same base 6 which is of insulating material, wherein the one of the electrodes 7 of the capacitor 3 is on the other side of the base 6 and the other electrode 7 of the capacitor 3 is formed by a part of the coil 5 on the opposite side of the base 6. The transponder means in this case an independent component that is capable of receiving and sending signals at radio frequencies. The planar sensor element 1 is formed in the centre of the coil 5 on the opposite side of the substrate 6 in relation to the coil 5. The sensor element 1 can, of course, also be with the coil 5 on the same side. Measurement is carried out otherwise similarly as in the embodiment of FIGS. 1 and 2, but the reader (not shown) located outside the package couples inductively by an alternating magnetic field to the LC resonator 3, 5. The reader measures the Q-factor and the resonance frequency of the LC resonator located inside the package as shown in the embodiment of FIGS. 1 and 2. The Q-factor of the LC resonator is dependent upon deterioration of the product or the amount of oxygen in the package. In this case the result of measurement is independent on the distance between the reader and the sensor element. The Q-factor measured is directly proportional to deterioration of the product or the amount of oxygen in the package.

2. Inductive Coupling

A Sensor Element for Example within the LC Resonator Inside the Package

In a second embodiment of the invention, the sensor element is a part of the LC resonator such that it couples inductively (by an alternate magnetic field) to the LC resonator. This alternative is shown in FIGS. 3 and 4. The sensor element 1 and the LC resonator 3, 5 form a transponder, which is disposed inside the package. This complex is formed from the base 6 which is of same insulating material, wherein the one of the electrodes 7 of the capacitor 3 is on the other side of the base 6 and the other electrode 7 of the capacitor 3 is formed by a part of the coil 5 on the opposite side of the base 6. The transponder means in this case an independent component that is capable of receiving and sending signals at radio frequencies. The planar sensor element 1 is formed in the centre of the coil 5 on the opposite side of the substrate 6 in relation to the coil 5. The sensor element 1 can, of course, also be with the coil 5 on the same side. Measurement is carried out otherwise similarly as in the embodiment of FIGS. 1 and 2, but the reader (not shown) located outside the package couples inductively by an alternate magnetic field to the LC resonator 3, 5. The reader measures the Q-factor and the resonance frequency of the LC resonator located inside the package as shown in the embodiment of FIGS. 1 and 2. The Q-factor of the LC resonator is dependent upon deterioration of the product or the amount of oxygen in the package. In this case the result of measurement is independent on the distance between the reader and the sensor element. The Q-factor measured is directly proportional to deterioration of the product or the amount of oxygen in the package.

3. Capacitive Coupling

A Sensor Element within the LC Resonator Inside the Package

Figures 5, 6:
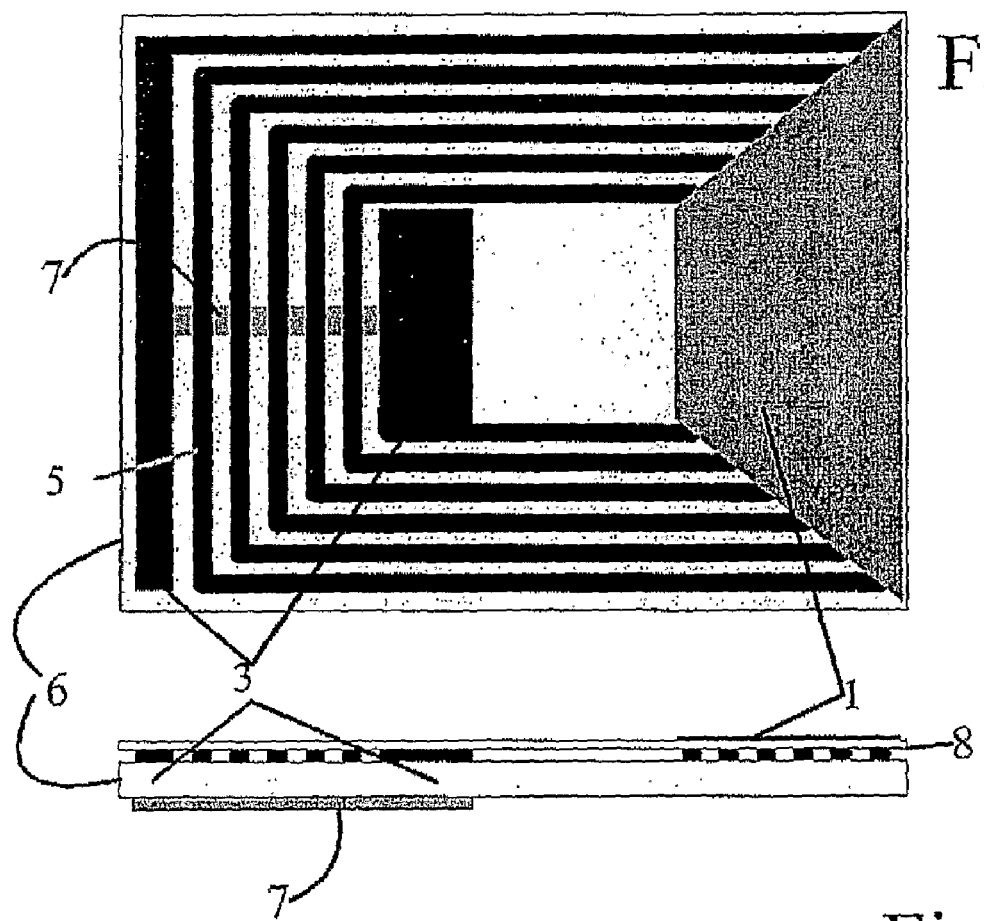
FIG. 5 shows a top view of a third sensor structure according to the invention.
FIG. 6 shows a cross-sectional elevation view of a sensor structure as in FIG. 5.

A third embodiment of the invention is similar to the second embodiment. In the third embodiment shown in FIGS. 5 and 6, the coupling between the sensor element 1 and the LC resonator 3 and 5 is however capacitive. It can be implemented for example such that a planar sensor element 1 is disposed in the electric field induced by the wires of a multi-turned coil 5, in practice, on top of the insulating plate 8 arranged above the coil 5. As in the second embodiment, the measured Q-factor is directly proportional to deterioration of the product or the amount of oxygen in the package.

A sensor arrangement according to the invention as described in the above embodiments can be, for example, one of the following combinations:
  a) A combination of LC resonator 3 and 5 contained in the reader for a separate sensor 1 and its bordering ring 2 (example 1).
  b) A combination of sensor 1 and transponder (coil and capacitor) (examples 2 and 3) in which the sensor element 1 and the LC resonator are of the same mechanical complex.

Figure 7A:
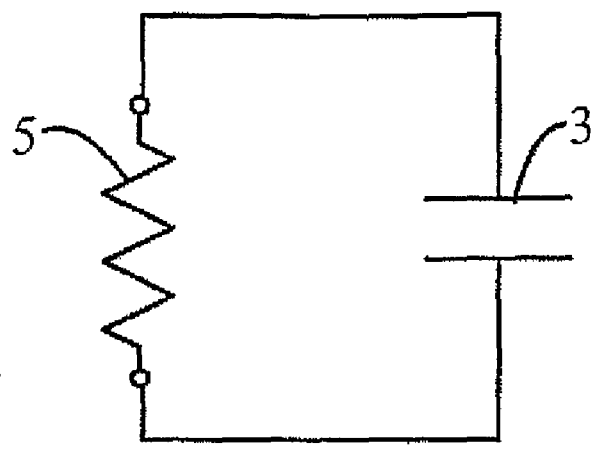
FIG. 7 *a-c* show as connection diagrams electrical equivalent circuits of an LC resonator suitable for the solution according to the invention.

According to FIG. 7a, an LC resonator is with ideal components a pure parallel coupling of a coil 5 and a capacitor. In this case a sensor element according to the invention inductively or capacitively affects the properties of either the coil 5 or the capacitor 3.

Figure 7B:
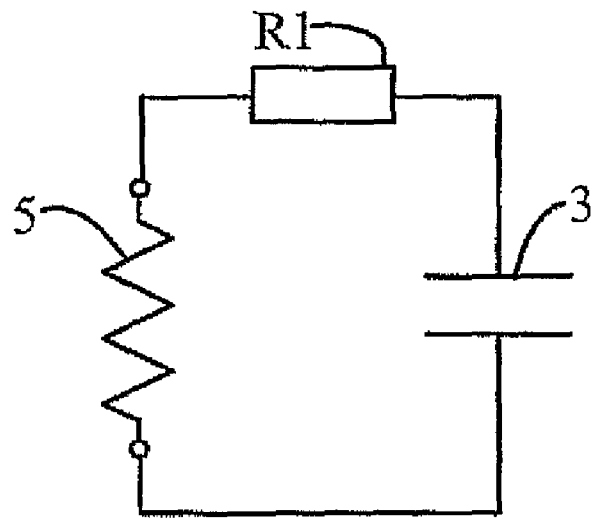

According to FIG. 7b, in the equivalent circuit suitable for the invention a serial resistor R1 can be used between the coil 5 and the poles of the capacitor 3. Some LC resonators R1 of known art have had an element susceptible to changes. The resistor R1 can then be a real component or it can represent an imperfection of the coil 5, a resistive component. In this alternative, as well, a sensor element according to the invention inductively or capacitively affects the properties of either the coil 5 or the capacitor 3.

Figure 7C:
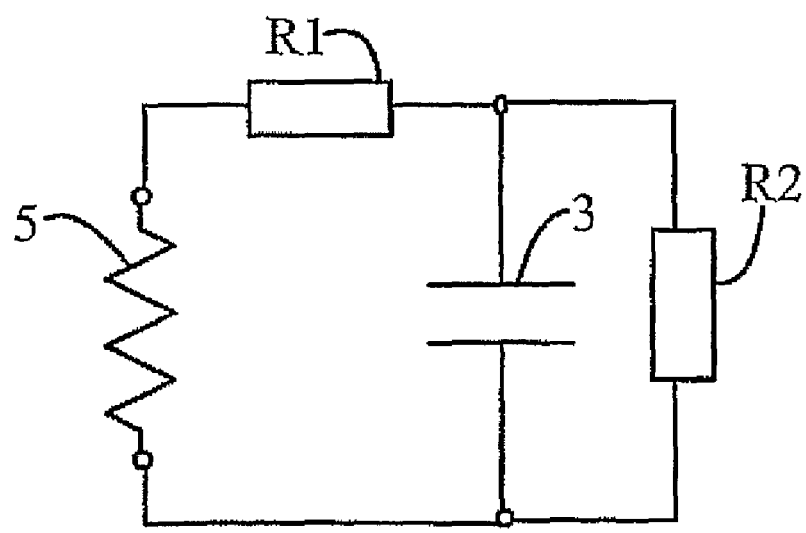

In FIG. 7c is shown, in addition to the components of FIG. 7b, a resistor R2 coupled in parallel with the capacitor 3, wherein the resistor can be a real component or alternatively it can represent an imperfection of the capacitor. In this alternative, as well, a sensor element according to the invention inductively or capacitively affects the properties of either the coil 5 or the capacitor 3.

In place of a cumulative sensor, other types of resistance-containing sensors can also be used. For example, the sensor can indicate a peak value, wherein an irreversible non-cumulative sensor element is used. Alternatively, the sensor can indicate a momentary value, wherein a reversible sensor element is used.

Also non-linear sensors, such as logarithmically or exponentially reacting sensors are in the scope of the invention entirely possible applications.

Also indexing sensors are suitable for the basic idea of the invention. These types of sensors are particularly practical in the case that it is desired to indicate the exceeding of a particular limit value.

In addition to different gases, the sensor element 1 can indicate e.g. moisture (water in different states or relative humidity), fluids, temperature, electromagnetic radiation or, for example, pressure.

According to the invention, a sensor element is coupled to the LC resonator in terms of circuit technology only capacitively or inductively without a galvanic contact. Inside the package there may be a high-resistive connection through the contents of the package between the sensor and the LC resonator, but in terms of measuring technology this is insignificant. In the scope of the invention a capacitive or inductive coupling means then that in terms of circuit technology the LC resonator and the sensor are not galvanically in contact.

In place of a cumulative sensor element, a sensor element showing a peak value may be used, which is reversible. Also non-linear sensor elements, such as logarithmically or exponentially reacting sensors are in the scope of the invention entirely possible applications. Also indexing sensors are suitable for the basic idea of the invention.

In the sensor or transponder structure itself can, of course, be included a microchip performing other functions.

A solution according to the invention can also be further improved for example by adding layers to protect or strengthen the sensor element or the transponder, sticking glue can be added to it for attaching, it can be laminated directly to the package or to different types of structures or it can be a discrete sensor. In addition, a sensor element or transponder according to the invention can also be implemented by many more solutions than has been shown in the examples.

The invention claimed is:

1. A sensor arrangement remotely readable by a separate reader utilizing radio frequencies for determining desired quantities from sources, the arrangement comprising:
   an LC resonator comprising a capacitor and a coil,
   an electrically conductive ring,
   a sensor element coupled to the LC resonator, whose properties change as a function of a measurable quantity, the sensor element being coupled inductively with the LC resonator without forming a direct galvanic contact, wherein the sensor element is arranged inside the electrically conductive ring and is thinner than the electrically conductive ring, and
   a package containing foodstuffs or medicinal substances, wherein the sensor element is arranged inside the package and the coil is arranged outside the package,
   wherein the coil is configured to generate a magnetic field on a location of the sensor element, and wherein the sensor element directly affects the magnetic field generated by the coil.

2. The sensor arrangement according to claim 1, wherein the sensor element is cumulatively variable.

3. The sensor arrangement according to claim 1, wherein the sensor arrangement is suitable for use in monitoring deterioration of foodstuffs and medicinal substances.

4. The sensor arrangement according to claim 1, wherein the ring is circular, oval or polygonal in shape.

5. An apparatus for indicating a deterioration event, said apparatus comprising:
   a sensor element capable of reacting with a compound generated by the deterioration event, or capable of reacting with oxygen,
   an LC resonator comprising a capacitor and a coil, wherein said coil is arranged to induce eddy currents in said sensor element by an alternating magnetic field generated by said coil, said eddy currents induce a voltage in said coil such that said voltage is dependent on electrical conductivity and thickness of said sensor element, and
   an electrically conductive ring having a thickness greater that the sensor element, wherein said sensor element is disposed inside the electrically conductive ring.

6. The apparatus according to claim 5, wherein said sensor element is sensitive to hydrogen sulfide.

7. The apparatus according to claim 5, wherein a frequency of an alternating current coupled to said coil is variable in order to determine a resonance frequency of said coil.

8. The apparatus according to claim 5, further comprising:
   a package, wherein said sensor element is located inside the package, and said coil is located outside the package.

9. The apparatus according to claim 8, wherein a perishable product selected from a group consisting of foodstuff and a medicinal substance is arranged inside the package.

10. The apparatus according to claim 5, wherein said sensor comprises a metal selected from a group consisting of silver and copper.

11. The apparatus according to claim 5, wherein said ring comprises aluminum.

12. A method for indicating a deterioration event by using a sensor element and an LC resonator, said LC resonator comprising a capacitor and coil, said method comprising:
   arranging the sensor element inside a package containing a perishable product, said sensor element being capable of reacting with a compound generated by deterioration of said perishable product, or capable of reacting with oxygen,
   generating an alternating magnetic field by said coil, inducing eddy currents in said sensor element by said alternating magnetic field, and
   inducing a voltage in said coil by said eddy currents, wherein said voltage depends on an electrical conductivity and a thickness of said sensor element, and wherein said sensor element is arranged inside an electrically conductive ring that is thicker than said sensor element.

13. The method according to claim 12, wherein said sensor element is sensitive to hydrogen sulfide.

14. The method according to claim 12, further comprising changing a frequency of an alternating current coupled to said coil in order to determine a resonance frequency of said coil.

15. The method according to claim 14, further comprising:
   determining a distance between said sensor element and said coil based on the measured changes in the resonance frequency of said coil.

16. The method according to claim 12, wherein said coil is located outside the package.

17. The method according to claim 16, wherein said perishable product is selected from a group consisting of foodstuff and a medicinal substance.

18. The method according to claim 12, wherein said sensor comprises a metal selected from a group consisting of silver and copper.

19. The method according to claim 12, wherein said ring comprises aluminum.

* * * * *